J. H. SWING.
Coffee Pot.
No. 47,466.
Patented April 25, 1865.
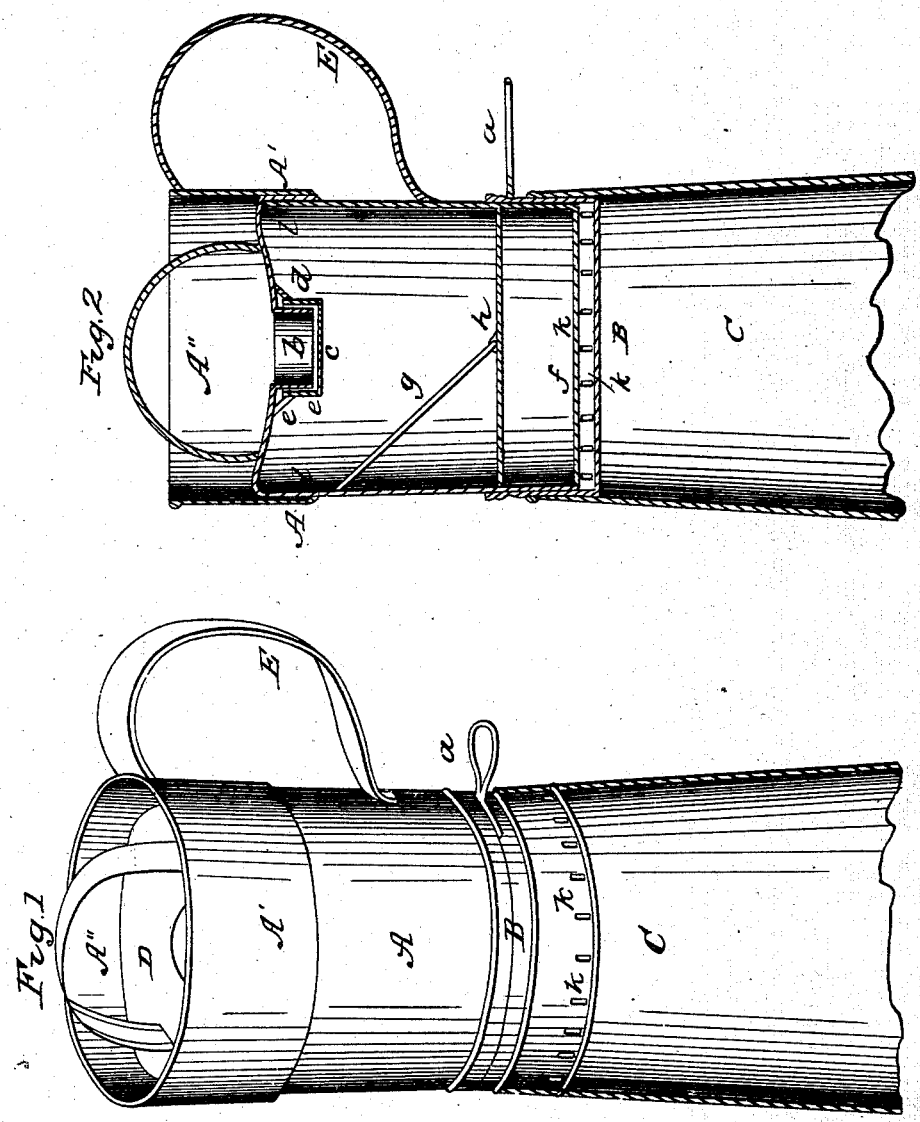
WITNESSES
W. H. Burridge
J. Holmes
INVENTOR
Jos. H. Swing

United States Patent Office.

JAMES H. SWING, OF CLEVELAND, OHIO.

COFFEE-POT.

Specification forming part of Letters Patent No. 47,466, dated April 25, 1865.

*To all whom it may concern:*

Be it known that I, J. H. SWING, of Cleveland, in the county of Cuyahoga and State of Ohio, have invented certain new and useful Improvements in Coffee-Pots; and I do hereby declare that the following is a full and complete description of the construction and operation of the same, reference being had to the accompanying drawings, making a part of this specification, in which—

Figure 1 is a perspective view of the upper part of the coffee-pot. Fig. 2 is a vertical section.

Like letters of reference refer to like parts in the views.

My improvement relates to constructing a coffee-pot in which the aroma of the coffee will not escape, the cover being put on so as to form a water-joint, and at the same time removing all liability of explosion.

A represents the upper section of the coffee-pot, placed in a filter, B, that fits into the top of the lower section, C, of the coffee-pot, as shown in the figures. D is the lid or cover, fitting down into the upper section, as represented. The peculiar construction of this lid, and also of the coffee-pot, is shown in Fig. 2, being a vertical section. In the center of the lid there is a hole or opening with a flange, $b$, that extends down into a cup, $d$, secured to the under side of the cover by connections $e$, so as to leave a space, $c$, all around and under the lower edge of the flange, as represented. The rim $l$ of the cover fits into an annular chamber formed by the projecting part $A'$ of the section A, there being a space between it and the part extending up inside for that purpose. The bottom plate, $f$, of the section A is perforated, forming a strainer, and there is a perforated disk, $h$, fitting into the section with a handle, $g$, attached at the center. The lower part of the section A is placed and fits loosely in the filter B, that has a handle, $a$, attached to one side. All around the filter are openings $k$, through which the coffee issues into the lower section of the coffee-pot, and the quantity of coffee allowed to pass through can be gaged by raising or lowering the section A in the filter by the handle E. The lower part of the section is inclined inward, to leave a suitable space between it and the filter for the flow of the coffee.

The manner of using this coffee-pot as constructed is as follows: The cover is removed, and also the disk $h$, and the coffee is put into the section A, when the disk is placed on top. The cover is then put on, as shown in Fig. 2, there being a space, $A''$, in the section above the cover, forming a cup or curb. The water is poured into this on the cover, which runs down in the center into the cup $d$, round up through the space $c$, and out over the upper edge of the cup into the section over the coffee, percolating through the disk $h$. The water fills the annular chamber round the rim $h$ of the cover, forming a water-joint that will prevent the escape of steam and the aroma of the coffee; and there being continually water in the cup $d$ and space $c$ a water-joint is formed there also. The steam being thus principally confined in the coffee-pot, the aroma is precipitated and taken up in the filtration, adding much to the strength and nutrition of the coffee.

In this coffee-pot, constructed as described, there will no steam escape with the ordinary amount of heat required in making the coffee; but should it exceed this, and much ebullition take place, the steam will pass over the cup $d$, down through the space $c$, under the flange $b$, and out. The steam can escape in the same way around the edge of the cover, thus effectually preventing explosion.

What I claim as my improvement, and desire to secure by Letters Patent, is—

1. The cup $d$ and flange $b$, in combination with the rim $l$, annular chamber, and section A, as and for the purpose set forth.

2. The disk $h$, strainer $f$, and filter B, in combination with the section A and cover D, as and for the purpose herein described.

JAS. H. SWING.

Witnesses:
W. H. BURRIDGE,
A. W. McCLELLAND.